Dec. 12, 1939.  E. C. HENDERSON  2,182,895
TIRE AIR PRESSURE SWITCH
Filed July 14, 1937
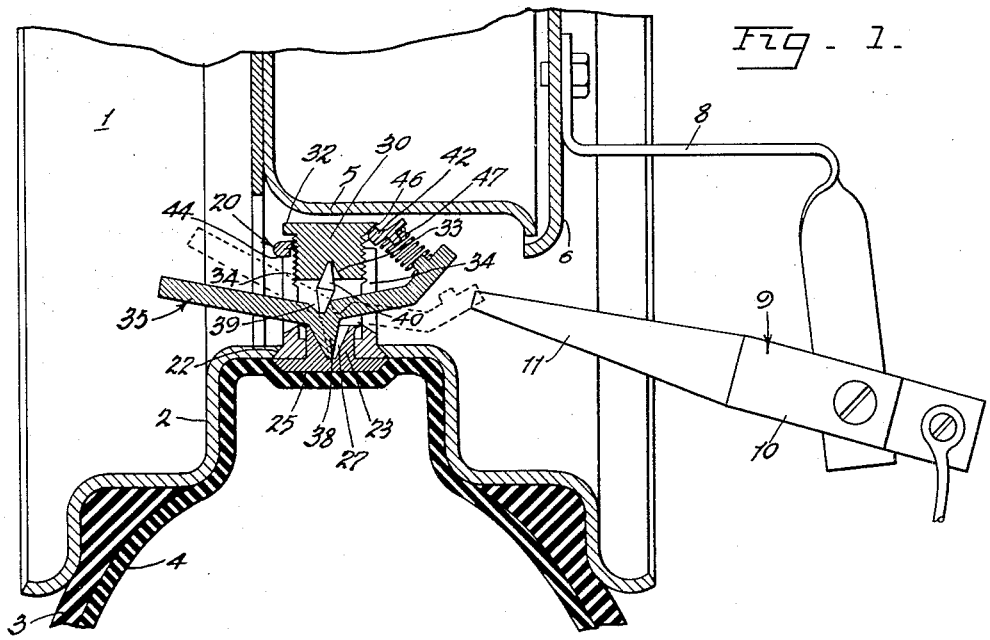
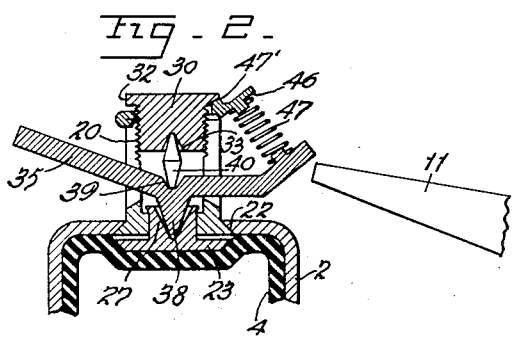
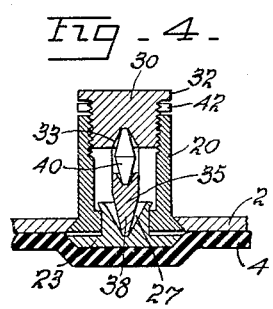
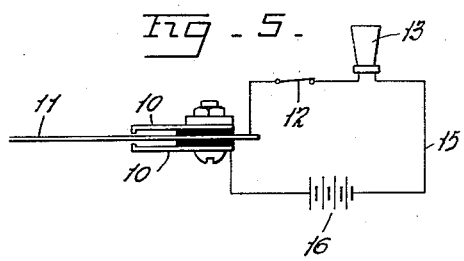
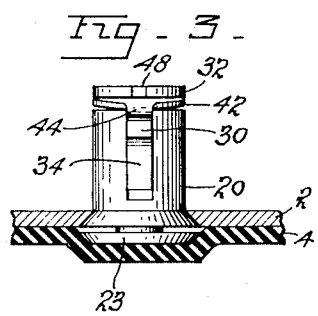
INVENTOR.
ELDON C. HENDERSON
BY
ATTORNEY.

Patented Dec. 12, 1939

2,182,895

UNITED STATES PATENT OFFICE 2,182,895

TIRE AIR PRESSURE SWITCH

Eldon C. Henderson, Paso Robles, Calif.

Application July 14, 1937, Serial No. 153,625

2 Claims. (Cl. 200—58)

This invention relates to alarm systems for indicating the drop of pressure in a pressure containing medium, and consists in the combination, construction, and arrangement of parts hereinafter described and claimed.

An object of the invention is to provide an alarm system in which means is provided for selecting the minimum of pressure below which the alarm shall be actuated.

Another object of the invention is to provide an alarm system particularly adapted to indicate the drop of pressure of air in a tire by means of an audible or visible alarm signal.

A further object of the invention is to provide an alarm system for indicating the drop of pressure in a tire, in which the toggle joint is employed to actuate the signal means.

A still further object of the invention is to provide a device which is extremely simple in construction and which is durable and efficient for the purpose intended.

Other objects and advantages will appear as the specification proceeds and the novel features of the device will be particularly pointed out in the claims hereto annexed.

In the accompanying drawing:

Fig. 1 is a section through a portion of a tire rim having a device thereon constructed in accordance with the teachings of my invention.

Fig. 2 is a central cross section through the device showing the parts in different position from that shown in Fig. 1.

Fig. 3 is a side view of Fig. 2.

Fig. 4 is a cross section of the device taken on the line 4—4 of Fig. 2.

Fig. 5 is a wiring diagram.

In general terms my invention comprises a hollow casing having a piston arranged within the casing and communicating with the pressure subjected medium. A spring pressed toggle joint is arranged in connection with the piston, which joint is adapted to shift its position whenever the pressure in the medium falls below a certain selected minimum and thereby to engage an alarm switch.

In detail, Fig. 1 shows a portion of a conventional automobile wheel 1 having a rim 2 carrying a pneumatic tire 3 and tube 4. A brake drum 5 is also carried by the wheel 1 which is closed by a stationary brake dust shield 6. To the latter is attached a bracket 8 which adjustably supports a switch 9 on the end thereof. As shown in Fig. 5, the switch 9 consists of two parallel side plates 10 and an elongated central blade 11 insulated therefrom. The latter is connected to a push button switch 12 which is connected with a signal 13 such as a horn, a light, or the like. A wire 15 connects the signal with a battery 16 which in turn is connected with the side plates 10. It will be readily understood that whenever the blade 11 is deflected from its normal position and contacts one of the side plates 10, an electric circuit is thus established which will energize the signal 13.

My invention consists of a device to actuate the switch 9 whenever the pressure in a tire drops below a certain preselected minimum. The device consists of a cylindrical hollow casing 20 having a conical flange at one end thereof which snugly fits a conical opening 22 in the rim 2, and by means of which the casing is removably retained by the latter. A piston 23 is slidably arranged in the end of the casing 20 adjacent to the rim 2, said piston being formed with a flat head 25 protruding inside of the rim and contacting the tube 4, the pressure of air in which forces the head 25 against the casing 20. The opposite end of the piston is flared out to prevent its removal from the casing 20 and has a central conical depression 27 formed therein, the purpose of which will be hereinafter fully described.

The other end of the casing 20 is internally threaded and closed by a plug 30 having a flange 32 on the outer end and a centrally located conical depression 33 in the inner end thereof. The casing 20 is formed with two opposite slots 34 extending through said casing. Disposed within said casing the lever 35 has a cone-shaped leg 38 dependent therefrom which projects into the depression 27 in the piston 23 and rests on the bottom thereof. As the depression 27 is wider at its top than the leg 38, the lever 35 is free to swing about the lowermost point of said leg from the position shown in full lines to that shown in dotted lines in Fig. 1.

The lever 35 is also formed with a conical depression 39 about the leg 38 in which one end of a pin 40 rests, the other end of said pin 40 being confined in the depressions 33 of the plug 30. The outer diameter of the depressions 38 and 33 is larger than the diameter of the pin 40, therefore the latter also has freedom to swing therein.

A washer 42 is interposed between the flange 32 of the plug 30 and the end of the casing 20 and has a lip 44 bent upon itself which is adapted to enter one of the slots 34. The washer 42 is also made with an extension 46 between which and the end 37 of the lever 35, an expansible coil spring 47 is interposed, to urge said extension upwardly against the flange 32. The extension 46 carries an embossment 47 which is adapted to enter one of several notches 48 cut in the flange 32. The spring 47 forces the embossment 47 into a notch 48 and swings the lip 44 downwardly into registry with the slot 34, thus locking the plug 32 and the casing 20 together.

It will be noted that the pin 40 and the leg 38 of the lever 35 constitute a toggle joint confined between the plug 30 and the piston 23. The spring 47 urges the end 37 of the lever 35 downwardly into an operative position, as shown in Fig. 1 in dotted lines. In order to shift the lever into the dotted position, it is necessary for the toggle joint to pass through a dead center position as shown in Fig. 2. That is, when the center lines of the pin 40 and the leg 38 form a straight angle, it is necessary to force the piston 23 outwardly against the pressure of air in the tube. This may happen only when the pressure of the spring 47 overcomes the resistance of air pressure in the tube 4.

The air pressure in the tube, which should be overcome by the pressure of the spring 47 and thus cause the toggle joint to shift, may be selected by changing the position of the plug 32. The further said plug is moved away from the piston 23 the closer is the angle formed by the center lines of the pin 40 and the leg 38 to a straight angle, and therefore the greater pressure in the tube 4 will be required to prevent the toggle joint from shifting. The closer the plug 32 and the piston 23 are, the smaller is the obtuse angle formed by the center lines of said pin and leg, and the greater effort is required to overcome it. Consequently the lesser pressure in the tube 4 will be required to prevent the toggle joint from shifting. Therefore by adjusting the plug 32 in the casing 20, the minimum pressure which is necessary to prevent the toggle joint from shifting may be carefully selected.

After the lever 35 has been shifted into an operative position, as shown in Fig. 1 in dotted lines, the end 37 thereof will strike the blade 11 of the switch 9 with every revolution of the wheel 1, causing it to contact one of the side plates 10, thus intermittently energizing the signal 13 as has been previously stated. A driver being informed that deflation is taking place in one of the tires, may, by pressing the push button notch 12, stop the signaling.

Additional air may be introduced into the tire and the device may be set in operative or "cocked" position (shown in full lines in Fig. 1). This may be accomplished by pressing the end 36 of the lever 35 downwardly.

While I have, for the sake of clearness and in order to disclose my invention so that the same may be readily understood, described and illustrated as applicable to a pneumatic tire, I desire to have it understood that this invention is not limited to this particular application, but may be advantageously applied in many other cases.

Having thus described this invention, what I claim and desire to secure by Letters Patent is:

1. In an alarm system for indicating the deflation of a pneumatic tire below a preselected minimum, comprising in combination a wheel having a rim carrying a pneumatic tire and a tube therein, a hollow casing affixed to the rim; a piston slidably carried by said casing and abutting the tube; a lever extending transversely through said casing and having an arm on one side thereof fulcrumed on said piston; a pin fulcrumed between said lever and a closed end of said casing at a point opposite the arm on said lever, said lever and pin being held in open position when the pressure of air in the tube is above a preselected minimum and adapted to be shifted into a different position when the air pressure in the tube drops below said minimum; and a spring to urge said lever to shift its position as well as the position of the fulcrum pin.

2. In an alarm system for indicating the deflation of a pneumatic tire below a preselected minimum, comprising in combination a wheel having a rim carrying a pneumatic tire and a tube therein; a hollow casing affixed to the rim; a piston slidably carried by said casing and abutting the tube; an adjustable plug carried by the other end of the casing; a lever extending transversely through said casing and having an arm on one side thereof fulcrumed on said piston; a pin fulcrumed between said lever and the plug in the closed end of the casing at a point opposite the arm on said lever, said lever and pin being held in open position when the pressure of air in the tube is above the preselected minimum and adapted to be shifted into different position when the air pressure in the tube drops below said minimum; and a spring to urge said lever to shift its position as well as the position of the fulcrum pin; and means for adjusting the position of the plug in the casing.

ELDON C. HENDERSON.